May 10, 1938.  E. L. GRANT  2,116,625
NAVIGATION APPARATUS
Filed May 27, 1935   3 Sheets-Sheet 1

INVENTOR.
Elmore L. Grant
BY
ATTORNEY.

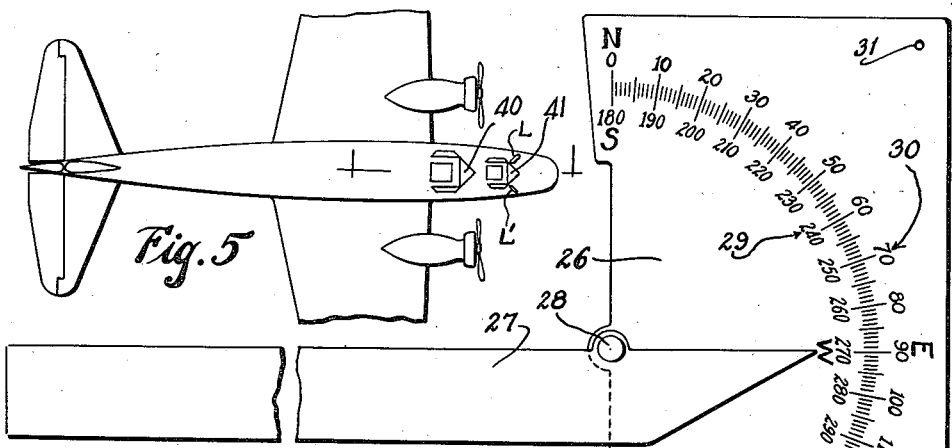
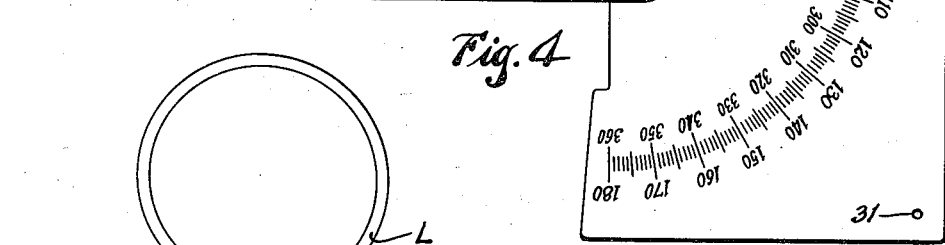
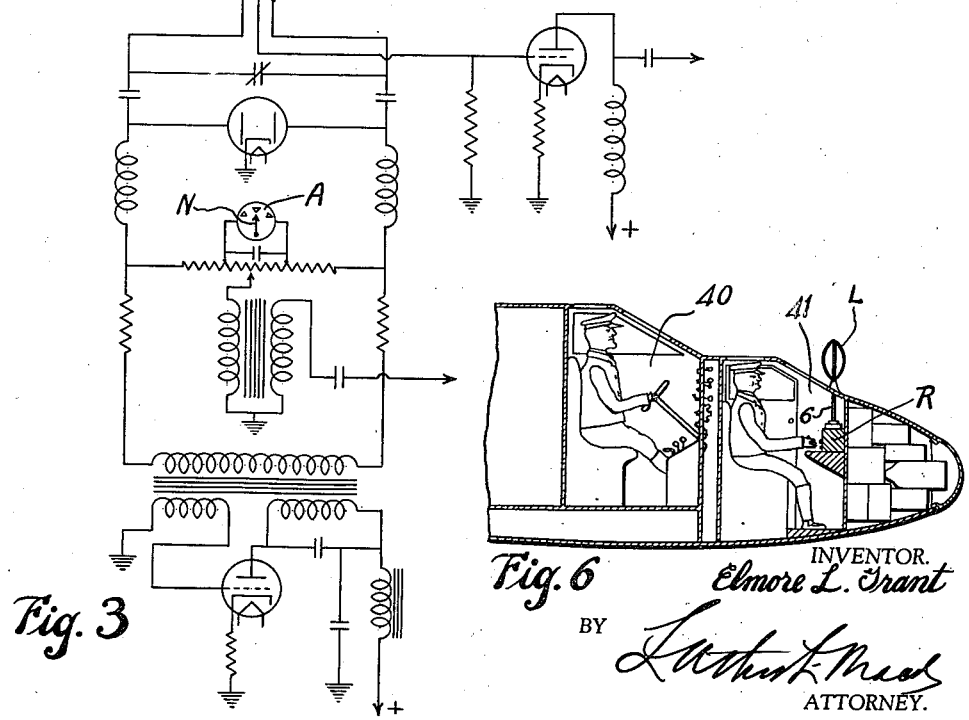

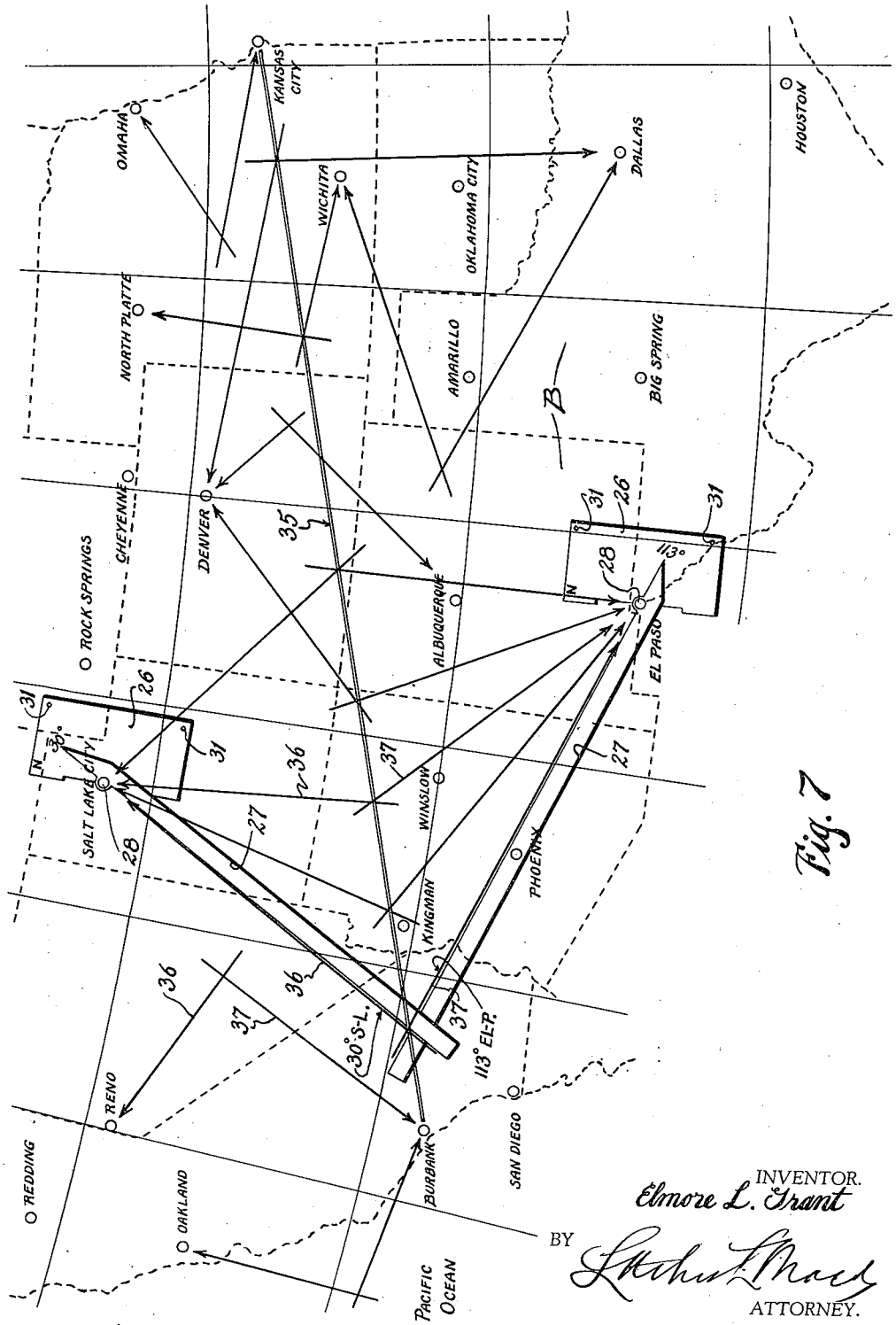

Patented May 10, 1938

2,116,625

UNITED STATES PATENT OFFICE 2,116,625

NAVIGATION APPARATUS

Elmore L. Grant, Los Angeles, Calif.

Application May 27, 1935, Serial No. 23,741

2 Claims. (Cl. 250—11)

My invention relates to and has for a primary object the provision of an apparatus particularly designed for use in connection with a navigation system of my origination and especially adapted for use in the navigation of land, water and air vessels or vehicles whereby successive reckonings may be taken for the purpose of accurately establishing the position of a vessel or a vehicle without complicated mathematical computations, with the navigator concealed, or where distinguishing landmarks are invisible or obscured.

A particular feature of my apparatus consists in the provision of two all wave radio signal receiving units positively geared to indicators associated with a magnetic compass and each provided with a loop antenna which is individually adjustable throughout a range of 360 degrees so as to simultaneously or successively receive signals from two separate stations, thereafter marking the angle of the signals on a charted course and indicating by their points of intersection the exact positions on a chart relative to the charted course and the adherence to or divergence in either direction from a true course.

The apparatus includes an electrical direction finder of usual design associated with each loop antenna for visibly indicating the conformance of the vessel to a true course, the magnetic compass for indicating magnetic north and indicators associated with the loop antennae and the magnetic compass for indicating the angle of the signals received whereby true north may be computed by allowance for known variations at scheduled points.

An apparatus of the character referred to enables a navigator to make successive reckonings at closely spaced points from two separate stations and to accurately mark his successive positions on a chart so drawn that his exact position may be quickly ascertained on land or sea. Moreover, when my apparatus is used in aerial navigation, a navigator is enabled to quickly ascertain from time to time his "ground speed", i. e. his actual flying progress relative to the ground beneath his craft. Thus, proper and accurate allowances may be made for headwinds, tail winds, etc., and the progress of an airplane on its course may be more accurately determined than is otherwise possible with instruments now in use.

I am aware that instruments now in use include a single loop antenna which is fixed in its position so as to parallel the longitudinal axis of the airplane and the divergence of the airplane from a true charted course is indicated by the radio direction finder and the volume of the signals received, but in my apparatus I contemplate the provision of some of the present instruments and some additional and novel features which will reduce errors to a minimum and render flying more certain and safe due to the reduced likelihood of accidents by reason of substantial divergence from a course and inability to determine the exact location of a plane at any time during its flight.

Other and more detailed objects of invention will appear as the description progresses.

I have shown in the accompanying drawings a preferred form of apparatus embodying my improvements, subject to modification, within the scope of the appended claims, without departing from the spirit of my invention. In said drawings:

Fig. 3 is a conventional circuit diagram of the electrical elements of a signal receiving set and radio compass which is typical of both of the receivers of the set;

Fig. 4 is an enlarged plan view of a special form of protractor, forming a necessary part of my system and useful for marking the reckonings on a chart;

Fig. 5 is a reduced scale plan of an airplane equipped with my improved navigating apparatus;

Fig. 6 is a fragmentary side elevation of the same, partly in section; and

Fig. 7 is a portion of a chart showing a charted course between terminals and certain reckonings made thereon for the purpose of indicating and determining the exact successive positions of an airplane relative to its true course.

Figure 1:
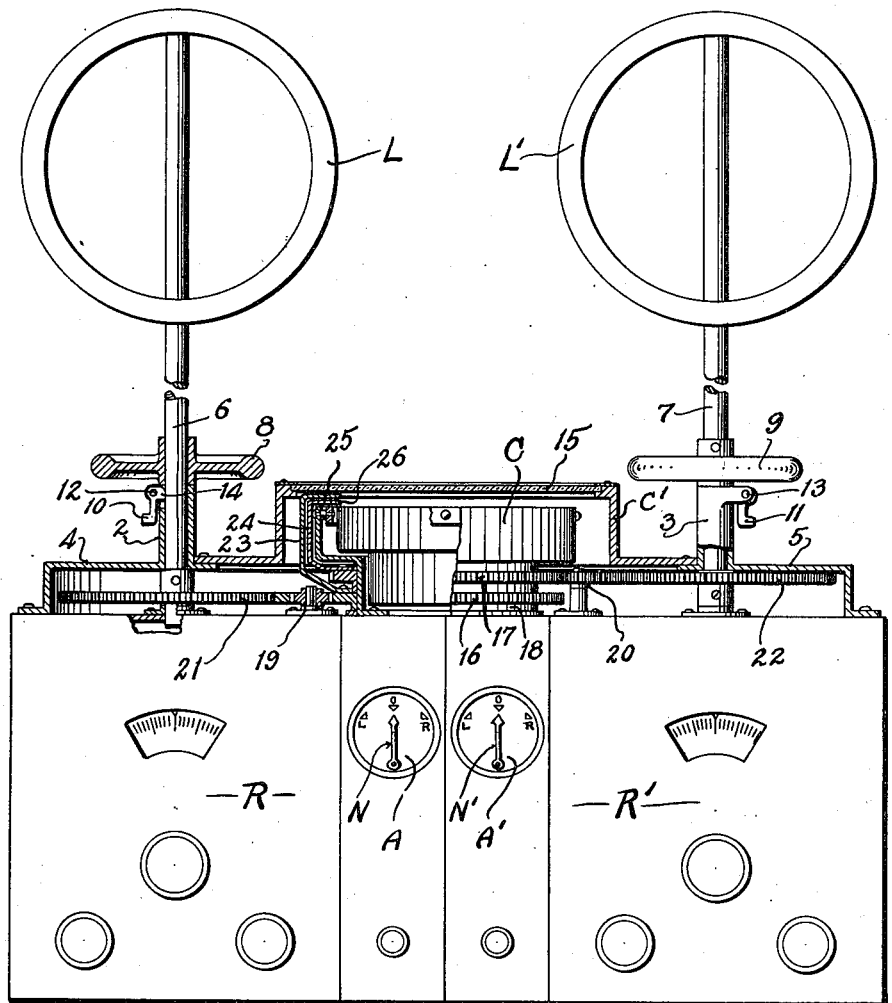
Fig. 1 is a front elevation of an integrally housed apparatus embodying the major elements of my system.
Figure 2:
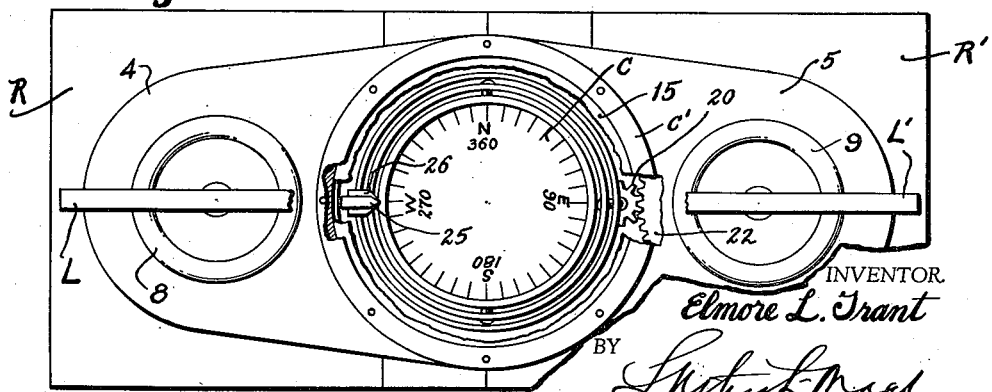
Fig. 2 is a top plan view of the same.

As shown in Figs. 1 and 2, the major elements of my system are arranged in a compact case and include a pair of spaced signal receiving units R and R' with intermediate direction finders A and A', respectively, associated therewith and electrically connected as shown in Fig. 3. Receiving units R and R' include axially adjustable loop antennae L and L' which are rotatably mounted, respectively, on the tops of said receiving units, as in bearings 2 and 3 extended upwardly from the tops of the case and formed on or attached to shallow metal casings 4 and 5, respectively.

Loops L and L' have vertical shafts 6 and 7, respectively, which are rotatable in the bearings 2 and 3 and hand wheels 8 and 9, respectively, by means of which the loops may be turned for varying the angles thereof so as to be alined with incoming radio signals. Latches 10 and 11 are pivotally held at points 12 and 13, respectively, on bearings 2 and 3 and each has a cam 14 adapted for frictional engagement with the associated shaft 6, or 7, of the loops so that the loops may be locked for maintaining the loops in selected positions for maintaining given signals effective in the apparatus.

A magnetic compass C of conventional form and character is mounted on the top of the case of the apparatus and is as usual enclosed within a case C' having a transparent top 15. As shown and preferably case C' communicates with the cases 4 and 5 and gears 16 and 17 are rotatably held on an inner annular member 18 which surrounds the compass C and said gears are operatively connected with the loop shafts 6 and 7, respectively, by means of pinions 19 and 20 and gears 21 and 22, respectively, in order that the gears 16 and 17 may rotate to correspond to and when the shafts 6 and 7 and their associated loops are rotated manually.

Indicators 23 and 24 are secured to 16 and 17, respectively, and extend upwardly at points outwardly of the periphery of the compass C and are bent inwardly at 25 and 26, respectively, so as to overlie the face of compass C. Thus, as the loops L and L' are adjusted on their axes into signal receiving positions relative to certain stations the angularity of the stations relative to magnetic north will be indicated on the scale of the compass C by said indicators and true north may then be calculated by allowing scheduled variations from the readings.

Of course, as in other forms of apparatus, the needles N and N' of the direction finders A and A' respectively, at all times indicate the course of a vessel or an airplane, or its divergence from a true course to the right or left, but by the employment of a pair of said compasses dual reckonings may be taken with respect to two different stations simultaneously and comparisons made with the reckonings made by the adjustment of the loops L and L', thereby affording far greater accuracy than when but a single directional compass is employed.

I have shown in Fig. 4 an improved form of protractor which is particularly adapted for use in connection with my system and includes a protractor head 26 with a radially disposed straight edge 27 pivotally held on the head at an axial point 28. Said protractor head has a scale of an extent of 180 degrees on the face thereof arranged with reversely marked graduations as at 29 and 30 both of which are concentric with the axis 28, and north and south indications are also arranged at an end of the scale, or at both ends thereof if desirable, so that the protractor is completely reversible; also ease and west indications may be shown at points intermediate the ends of the scale.

The protractor shown herein is adapted to be set on a chart, as at B in Fig. 7, with the axial point 28 over the station marked on the chart B and the North indication on the head 26 alined with true north, whereupon thumb tacks or other devices may be employed for immovably holding the protractor in its fixed position, holes 31, 31, being provided in the head for such purpose.

Thus, the angles of a vessel or an airplane relative to two separate stations having been determined by the adjustment of the loops L and L', due allowance having been made for variation from a true north, the straight edge 27 of the protractor is successively adjusted relative to the scale of the protractor so that it will be disposed at corresponding angles, and lines are then drawn on the chart crossing the charted true course of the vessel, and their points of intersection will indicate on the ground map the exact position of the vessel at that moment.

By reference to Fig. 7, it will be noted that the charted course of an airplane is thereon represented by a straight line 35 extending from Burbank, California, to Kansas City, Missouri, and pairs of intersecting lines, as at 36 and 37, are shown which represent reckonings taken from a sending station at Salt Lake City, Utah, and El Paso, Texas, respectively, at successive times and points along the course 35. It will be noted that some of the reckoning lines 36 and 37 intersect at points slightly off of the true course, to the right or to the left, and such divergence will of course be indicated by the radio compasses A and A'.

As the airplane progresses on its course reckonings may be taken rearwardly from the same stations by reversing the protractor, i. e. by reading the reverse scale thereof and substituting the north indication for the south indication, or vice versa, and adjusting the straight edge 27 from the inner to the outer scale, or vice versa. Or reckonings may be taken from other sending stations such as Denver, Colorado, and Dallas, Texas.

It is quite apparent that when the chart B is of such scale and accuracy that State, County, Township and Range Lines are shown thereon it is possible by marking the lines 36 and 37 on a chart to accurately locate the points of intersection on the chart so that the exact position of the plane may be communicated to the home or other stations on the line of travel and detailed logs of trips may be kept for information and guidance of the pilots on succeeding trips.

In Figs. 5 and 6 I have shown a modern airplane which may have a cockpit 40 and a navigation room 41, the latter being in the bow of the plane ahead of the cockpit and pilot and the receiving apparatus R and R' and associated elements are preferably mounted in the navigation room immediately below the top so that the shafts 6 and 7 of the antennae may extend through the top, as shown or otherwise, and the loops may be positioned externally of and above the fuselage. Thus, a minimum of interference with signal reception will be encountered and the unsatisfactory conditions now encountered when the loop is usually at the rear and inside of the fuselage is overcome.

I have shown and described my improved navigating apparatus herein in connection with airplane navigation for which it is particularly adapted but it will be readily understood that the apparatus may be used on land vehicles and marine vessels with equal effect and accuracy. The use of the apparatus eliminates the necessity for intricate mathematical calculations for determining the position of ships at sea as well as on airplanes, and in the latter case makes it possible to accurately determine the speed of progress actually made over the ground, regardless of wind velocity or driftage from a true course, and moreover, enables a navigator to determine the extent and constant or varying direction and rate of driftage at all times from an established course.

By reference to the chart B it will be observed that reckonings may be taken with equal results forwardly or rearwardly of an airplane while flying its course and all positions preliminarily established may be checked and rechecked with the same or different sending stations either ahead of or behind the airplane.

What I claim, is:

1. A navigating apparatus comprising: a pair of radio signal receiving units each including a signal operated direction finder and a loop antenna electrically connected, a magnetic compass mounted intermediate said receiving units, a pair of independently operable indicators associated with said magnetic compass, gearing positively connecting said antennae with said indicators, for indicating the angularity of said antennae relative to magnetic North as shown on said magnetic compass, and means for manually and independently operating said antennae to different extent, said gearing including separate gears surrounding said compass and each gear associated with a different antenna and independently operable thereby.

2. A navigating apparatus comprising: a pair of radio signal receiving units each having an independently adjustable loop antenna electrically connected therewith, for receiving signals simultaneously from two different sources, means associated with said antennae for indicating the direction of said signal sources at different points on the course of a craft equipped with said apparatus, said means including a magnetic compass, ring gears surrounding said compass and operatively connected with said antennae and an indicator carried by each gear and overlying said compass each of said ring gears being associated with a different antenna and independently operable thereby.

ELMORE L. GRANT.